E. MYKLEBUST.
DRAFT EQUALIZER.
APPLICATION FILED SEPT. 11, 1915.

1,182,403.

Patented May 9, 1916.

Witness
Stuart Hilder.

Inventor,
Emil Myklebust
E. W. Anderson
his Attorneys

By

UNITED STATES PATENT OFFICE.

EMIL MYKLEBUST, OF TIOGA, NORTH DAKOTA.

DRAFT-EQUALIZER.

1,182,403.  Specification of Letters Patent.  Patented May 9, 1916.

Application filed September 11, 1915. Serial No. 50,208.

*To all whom it may concern:*

Be it known that I, EMIL MYKLEBUST, subject of the King of Norway, resident of Tioga, in the county of Williams and State of North Dakota, have made a certain new and useful Invention in Draft-Equalizers; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1:
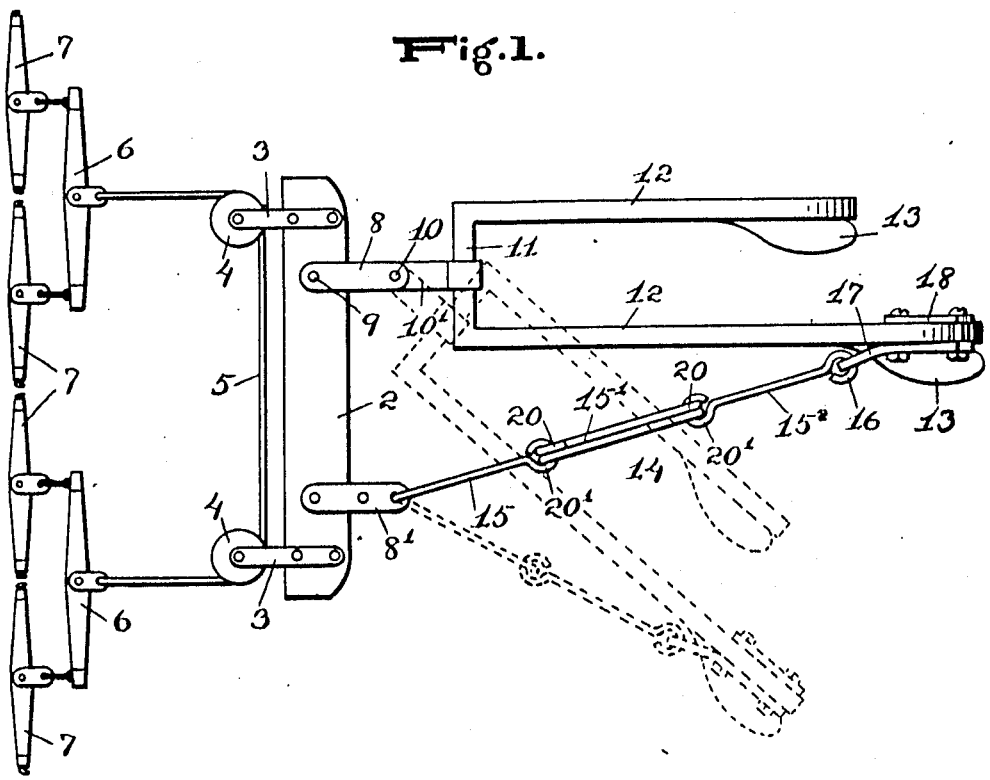
Figure 2:
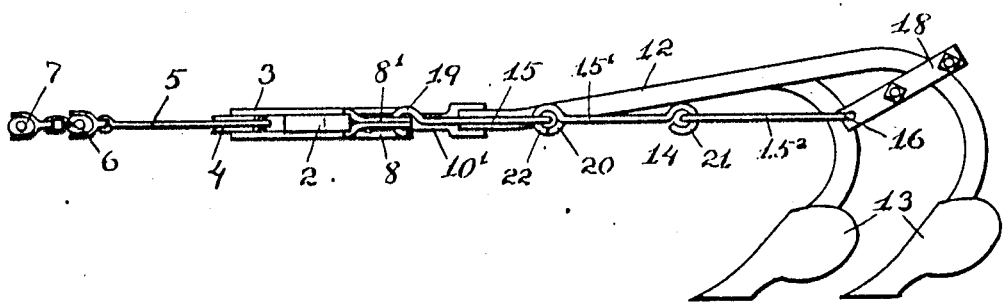

Figure 1 is a plan view of the invention, parts being shown as turned to one side, in dotted lines. Fig. 2 is a side view of the invention.

The invention has relation to draft equalizers or eveners, and it consists in the novel construction and combinations of parts, as hereinafter set forth.

In the accompanying drawings, illustrating the invention, the numeral 2 designates the draft bar, having at opposite ends thereof forwardly projecting brackets 3, 3, carrying pulleys 4, 4, a chain or cable 5 extending longitudinally of said bar and passing under and forwardly of said pulleys, said chain being connected at its ends to the central portions of doubletrees 6, 6, provided with swingletrees 7, 7, designed for use preferably with four horses.

Rearwardly projecting brackets 8, 8', are provided in rear of the evener bar, at opposite ends thereof, the bracket 8 being pivoted at its forward end to said bar at 9 and having at its rear end pivotal connection at 10 with a clip 10' of the central portion of a plow frame 11, said frame being provided with plow beams 12, 12, carrying the plow shares 13, 13.

To the other bracket, 8', is connected a flexible chain 14, usually made up of three links 15, 15', 15², said chain extending obliquely to the upper rear portion of the plow beam 12 at this side and having connection by eye 16 thereof with an obliquely extending arm 17 of a clip 18 upon said beam. The forward link 15 has a detachable connection by hook 19 thereof with the bracket 8' aforesaid, and the middle link 15' is double, one member thereof having terminal eyes 20, 20, engaging terminal eyes 20' of the other links, and the other member having an eye 21 engaging the inner eye 20' of the link 15² and a terminal hook 22 engaging detachably the inner eye 20ᵃ of the link 15.

As shown in dotted lines, Fig. 1 of the drawings, the forward hook of the middle link member is capable of engagement with the bracket 8', to shorten the chain and hold the plow frame and its shares adjusted to one side upon the pivotal connection 10 thereof.

I claim:

In a draft equalizer, a draft bar, rearwardly extending brackets at opposite end portions of said bar, a plow frame having a central pivotal connection with one of said brackets, said frame having lateral plow beams and suitable plow shares, and an oblique flexible chain composed of a forward link having a forward hook detachably engaging the other of said brackets and a rear terminal eye, a middle double link one member of which has a forward terminal eye engaging the rear eye of the forward link, and a rear terminal eye, and the other member of which has a rear terminal eye, and a forward hook normally detachably engaging the rear eye of the forward link, and a rear link having a forward eye engaging the rear eyes of the two members of the middle link and a rear terminal eye engaging the upper rear portion of one of said beams, the forward hook of the member of the middle link being capable of engagement with the last named bracket to shorten the chain and hold the plow frame and its shares adjusted to one side upon said pivotal connection.

In testimony whereof I affix my signature in presence of two witnesses.

EMIL MYKLEBUST.

Witnesses:
WM. J. LARSON,
ARTHUR FREDRICKSON.